United States Patent Office 2,898,706
Patented Aug. 11, 1959

2,898,706
IMPROVING THE PHYSICAL PROPERTIES OF CLAY SOILS BY TREATING WITH ALKENYL POLYAMINES

John W. Lyons, Reading, Mass., assignor to Monsanto Chemical Company, St. Louis, Mo., a corporation of Delaware No Drawing. Application April 8, 1957
Serial No. 651,187

19 Claims. (Cl. 47—58)

This invention relates to an improved procedure for increasing the workability of clay soils and to the improved clay soil obtained thereby. More specifically this invention relates to an improved process for increasing the workability of clay soils wherein the said soils are treated with a minor amount of an alkenyl polyamine.

A major problem in the construction industry relating to soil engineering has been providing a suitable means of incorporating modifying chemicals into clay-containing soils. For example, soil-cement compositions have been widely employed in the construction of highway subgrade, but have not been generally successful with highly plastic soils. It generally has been found that the higher the plastic index of the clay-containing soils, the more difficult it is to intimately mix the cement with the clay soil. This is also generally true with various other materials which may be added to soils to modify the physical characteristics thereof.

The principal object of this invention is to provide a means of substantially improving the workability of clay-containing soils. Another object of this invention is to provide a means of decreasing the plastic index of clay-containing soils. Still another object of this invention is to provide a means of effecting the mixing of materials into wet clay-containing soils at a net power reduction in the mixing operation and effecting a more homogeneous mixture in a shorter time. A further object of this invention is to provide a clay soil composition which can be effectively worked over a relatively wide range of soil moisture conditions. A still further object of this invention is to provide a means of modifying clay soils into soils having the necessary physical characteristics to render them suitable for agricultural use. Other objects will be apparent from the following disclosure.

It has now been found that the addition of from about 0.1 to about 2 percent and preferably from about 0.25 to about 1 percent by weight, based on the dry weight of the soil, of an alkenyl polyamine, as hereinafter more fully defined, to clay-containing soils effects a reduction in the plastic index of the clay-containing soil, renders the wet clay-containing soil workable over a wide range of moisture content, provides a dry-appearing, free-flowing soil wherein chemical modifiers can be readily mixed into the soil to effect a substantially uniform distribution therein and the mixing operation is effected at a lower net power consumption.

The various alkenyl polyamines which can be employed in this invention can be defined as the reaction products of an alkenyl chloride containing from about 8 to about 16 carbon atoms with an aliphatic or alicyclic primary or secondary polyamine, e.g. such that the product has the formula:

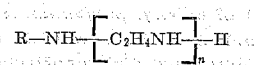

wherein R is a higher alkenyl radical containing from 8 to 16 carbon atoms and $n$ is an integer from 1 to 4. Illustrative alkenyl polyamines of this class are N-tetrapropenyl ethylenediamine, N-tetrapropenyl diethylenetriamine, N-tetrapropenyl triethylenetetramine, N-pentapropenyl ethylenediamine, N-pentapropenyl diethylenetriamine, N-(1-tert-butyl-2-methylallyl) ethylenediamine, N-(1-tert-butyl-2-methylallyl) triethylenetetramine, N-(1-tert-butyl-2-methylallyl) tetraethylenepentamine, N-triisobutenyl ethylenediamine, N-triisobutenyl diethylenetriamine, and the like. The alkenyl polyamines are prepared by the condensation of an alkenyl chloride and the amine by heating a mixture thereof at reflux temperature, as disclosed and claimed in the copending application of T. E. Lesslie and R. J. O'Neill, Serial No. 640,062, filed February 14, 1957.

The clay-containing soils which can be benefited by the alkenyl polyamine treatment preferably includes those soil compositions containing from about 20 to about 70 percent or more of clay in accordance with the well-known triaxial textural classification chart of the U.S. Bureau of Chemistry and Soils. These soils include the various soils classified as clay, sandy clay, silty clay, clay loam, sandy clay loam, and silty clay loam. Various illustrative specific clay-containing soils are for example clay from the Hybla Valley, Virginia, Cecil clay, Houston clay, Lake Charles clay, Capay silty clay loam, and the like.

The workability of the clay-containing soil can be modified by the treatment with an alkenyl polyamine prior to the addition of other chemical modifiers, such as Portland cement, and this procedure may be preferred with particularly gummy clay soils, or by adding the alkenyl polyamine in a single-treatment operation with other materials. In the latter case the treatment of the clay-containing soil can be readily effected by the addition of a calculated amount of the alkenyl polyamine, which can be added directly or as an aqueous solution, dispersion, suspension, emulsion, and the like, and the other chemical modifiers in finely divided solid or liquid form, depending on the depth of soil to be treated and the moisture content of said soil, by application with a P and H single-Pass Soil Stabilizer, Seaman Pulvi-mixer, or similar apparatus, or by application of the said materials and any necessary additional amount of water, to provide the optimum moisture conditions for compaction of the particular soil being treated, to the soil surface by other suitable means and mixing with various traveling pug mills, roto-tillers and the like. Normally it is desirable to treat the soil to a compacted depth of at least about 6 inches to provide a well-stabilized subgrade. After the treatment of the clay-containing soil with the desired amount of alkenyl polyamine and stabilizer materials it is compacted by the application of a sheepsfoot roller and thereafter leveled and further compacted by pneumatic-tired rollers and then with smooth rollers if desired. Thereafter the treated soil is generally covered with a light coating of bituminous material by spray application or other suitable means to prevent substantial loss of moisture therefrom during curing. Then a suitable subbase and topping can be applied thereover or the topping can be applied directly to the stabilized subgrade as desired.

It has also been found that the alkenyl polyamines, defined above, are effective modifiers in the treatment of clay-containing agricultural soils, whereby a wet soil can be converted to a dry-appearing, free-flowing soil. By effecting the aggregation of the clay soil, water is permitted to penetrate the soil thereby materially reducing surface erosion and the soil has a decreased tendency to puddling when wet and does not crust over in dry weather, thus maintaining the essential aeration characteristics of an agricultural soil. Since the clay soil treated with an alkenyl polyamine is friable even at high relative moisture contents, the soil can be readily worked over a substantially greater water-content variation than can the untreated soil. Accordingly, it is possible to work bottom lands which are otherwise so slow to drain that it is substantially impossible to work them in time to plant a crop with reasonable assurance that it will mature. The treated soil also has an improved water-holding capacity, thus maintaining a reserve water supply for dry periods.

The plastic index of a soil is defined as the range of moisture content over which the soil is plastic and is expressed as the difference between the moisture content of the soil at the liquid limit minus the moisture content of the soil at the plastic limit. It will be seen from the following examples that the alkenyl polyamine effects a reduction in the plastic index and generally increases both the plastic limit and the liquid limit of the soil whereby it is apparent that the treated soil can be worked over a correspondingly greater moisture content.

The following examples are illustrative of the instant invention.

Example 1

A heavy clay soil identified as Panton Clay from Burlington, Vermont, and containing 70 percent clay, 22 percent silt and 8 percent sand was found to have a liquid limit of 56, a plastic limit of 26 and a plastic index of 30. two percent of N-tetrapropenyl diethylenetriamine (that is, a compound of the structure R—$NHC_2H_4NHC_2H_4NH_2$ wherein R is a tetrapropenyl radical containing one double bond), by dry weight of the clay soil, was mixed therein and the Atterberg limits redetermined. The liquid limit was raised to 67, the plastic limit was raised to 40, and the plastic index was lowered to 27. The material increase in the plastic limit effected by the addition of the N-tetrapropenyl diethylenetriamine clearly demonstrates that the treated soil can be readily worked in the field over a substantially greater moisture-content range.

Example 2

A sample of clay from the Hybla Valley in Virginia contained 33 percent clay, 24 percent silt, and 43 percent sand. This clay soil was found to have a liquid limit of 46, a plastic limit of 22, and a plastic index of 24. A sample of this clay was treated with 2 percent of N-tetrapropenyl diethylenetriamine (that is, a compound of the structure R—$NHC_2H_4NHC_2H_4NH_2$ wherein R is a tetrapropenyl radical containing one double bond), by dry weight of the soil, the alkenyl polyamine mixed therein and the Atterberg limits redetermined. The liquid limit was 45, the plastic limit was raised to 33, and the plastic index was reduced to 12. It will be noted that the treated soil had a plastic limit 50 percent greater than the untreated soil.

Example 3

Two clay soils from Indiana, identified as Soil 823 and Soil 918C were treated with varying amounts of N-tetrapropenyl diethylenetriamine (that is, a compound of the structure R—$NHC_2H_4NHC_2H_4NH_2$ wherein R is a tetrapropenyl radical containing one double bond) (NTD) and the Atterberg limits determined as indicated in the following table:

| Soil | Percent NTD | Liquid Limit | Plastic Limit | Plastic Index |
| --- | --- | --- | --- | --- |
| 823 | 0 | 24 | 14 | 10 |
| 823 | 0.25 | 25 | 18 | 7 |
| 823 | 0.5 | 26 | 19 | 7 |
| 823 | 1.0 | 27 | 20 | 7 |
| 918C | 0 | 64 | 21 | 43 |
| 918C | 0.5 | 67 | 34 | 33 |
| 918C | 1.0 | 64 | 37 | 27 |
| 918C | 2.0 | 60 | 39 | 21 |

In addition to the above evaluations, qualitative comparative observations were made as to the effect of the alkenyl polyamine on the mixing characteristics of the above soils. The optimum moisture contents for the maximum dry density of Soil 823 and 918C were respectively found to be about 10.2 percent and about 20 percent. Soil 823 at about 11 percent moisture content was observed to be damp and lumpy after mixing for 12 minutes, whereas the addition of 0.5 percent of the NTD converted the soil into a dry-appearing, free-flowing composition. Similarly Soil 918C at about 20 percent moisture content was observed to be very plastic and difficult to work and produced large, hard lumps during the 12-minute mixing test, whereas the addition of 1 percent of NTD converted the soil into a non-plastic, dry-appearing, free-flowing composition which was easy to mix.

Example 4

A relative, quantitative test was devised to determine variations in soil workability by measuring the differences in power drawn by a mixer during a fixed period of time, which test was supplemented by visual observation during the mixing procedure. The mixer was allowed to run for a sufficient period to warm up the motor and bearings then the power consumption of the mixer for a 15-minute period was determined. Then sufficient air-dry test soil was added to the mixer to provide 1500 parts by weight of oven-dry (110° C.) soil and the desired quantity of water or water-alkenyl polyamine composition was quickly added thereto. The mixer was started simultaneously with the addition of the liquid and the power consumption determined for a 15-minute run. Samples of the wet soil were taken to check the calculated amount of water present therein.

The heavy clay soil employed in Example 1 was evaluated in the above manner with the following results:

| Percent N-Tetra-propenyl diethylene-triamine | Percent Moisture Content | Percent Power Reduction |
| --- | --- | --- |
| 0.1 | 15 | 12 |
| 0.1 | 20 | 25 |
| 0.1 | 28 | 32 |
| 2 | 15 | 25 |
| 2 | 20 | 30 |
| 2 | 28 | 24 |

The treated soil was observed to be a dry-appearing, free-flowing composition.

In similar fashion the mixing power was evaluated for the clay soil of Example 2, wherein the addition of 0.5 percent and 2 percent of N-tetrapropenyl diethylenetriamine (that is, a compound of the structure $$R\text{—}NHC_2H_4NHC_2H_4NH_2$$

wherein R is a tetrapropenyl radical containing one double bond), at a soil moisture content of about 18 percent, respectively effected a power reduction of 25 and 30 percent and provided dry-appearing, crumbly and dry-appearing, free-flowing soil compositions.

This application is a continuation-in-part of my copending application Serial No. 649,300, filed March 29, 1957.

I claim:

1. A method for the improvement of the soil structure of clay-containing soils comprising the distribution in a clay soil in intimate admixture therewith of from about 0.1 to about 2 weight percent, based on the dry weight of the soil of an alkenyl polyamine, defined by the formula R—NH($C_2H_4$NH)$_n$H, wherein R is a higher alkenyl radical containing from 8 to 16 carbon atoms and $n$ is an integer from 1 to 4.

2. The method of claim 1, wherein from about 0.25 to about 1 percent of alkenyl polyamine is employed.

3. The method of claim 2, wherein the alkenyl polyamine is N-tetrapropenyl diethylenetriamine.

4. The method of claim 2, wherein the alkenyl polyamine is N-tetrapropenyl triethylenetetramine.

5. The method of claim 2, wherein the alkenyl polyamine is N-tetrapropenyl ethylenediamine.

6. The method of claim 2, wherein the alkenyl polyamine is N-triisobutenyl diethylenetriamine.

7. The method of claim 2, wherein the alkenyl polyamine is N-pentapropenyl diethylenetriamine.

8. A method for the improvement of the soil structure of clay-containing soils comprising the distribution in a clay soil containing from about 20 to about 70 percent clay in intimate admixture therewith of from about 0.1 to about 2 weight percent, based on the dry weight of the soil, of an alkenyl polyamine, defined by the formula R—NH($C_2H_4$NH)$_n$H, wherein R is a higher alkenyl radical containing from 8 to 16 carbon atoms and $n$ is an integer from 1 to 4.

9. The method of claim 8, wherein from about 0.25 to about 1 percent of alkenyl polyamine is employed.

10. The method of claim 9, wherein the alkenyl polyamine is N-tetrapropenyl diethylenetriamine.

11. The method of claim 9, wherein the alkenyl polyamine is N-tetrapropenyl triethylenetetramine.

12. The method of claim 9, wherein the alkenyl polyamine is N-tetrapropenyl ethylenediamine.

13. The method of claim 9, wherein the alkenyl polyamine is N-triisobutenyl diethylenetriamine.

14. The method of claim 9, wherein the alkenyl polyamine is N-pentapropenyl diethylenetriamine.

15. Clay-containing soil conditioned with from about 0.1 to about 2 weight percent, based on the dry weight of the soil, of an alkenyl polyamine, defined by the formula R—NH($C_2H_4$NH)$_n$H, wherein R is a higher alkenyl radical containing from 8 to 16 carbon atoms and $n$ is an integer from 1 to 4.

16. Clay-containing soil conditioned with from about 0.25 to about 1 weight percent, based on the dry weight of the soil, of an alkenyl polyamine, defined by the formula R—NH($C_2H_4$NH)$_n$H, wherein R is a higher alkenyl radical containing from 8 to 16 carbon atoms and $n$ is an integer from 1 to 4.

17. Clay-containing soil conditioned with from about 0.25 to about 1 weight percent, based on the dry weight of the soil, of N-tetrapropenyl diethylenetriamine.

18. Clay-containing soil conditioned with from about 0.25 to about 1 weight percent, based on the dry weight of the soil, of N-tetrapropenyl triethylenetetramine.

19. Clay-containing soil conditioned with from about 0.25 to about 1 weight percent, based on the dry weight of the soil, of N-tetrapropenyl ethylenediamine.

References Cited in the file of this patent

UNITED STATES PATENTS

| | | |
|---|---|---|
| 2,172,822 | Tamele | Sept. 12, 1939 |
| 2,267,205 | Kyrides | Dec. 23, 1941 |

OTHER REFERENCES

Jamison: "Symposium on Transmission of Water Through Soils . . .," published 1947 in Soil Science Society of America Proceedings 1946, vol. II, pages 103 through 109, and title page. (Copy is in Division One at 47–Soil Treatment.)